Figure 1:
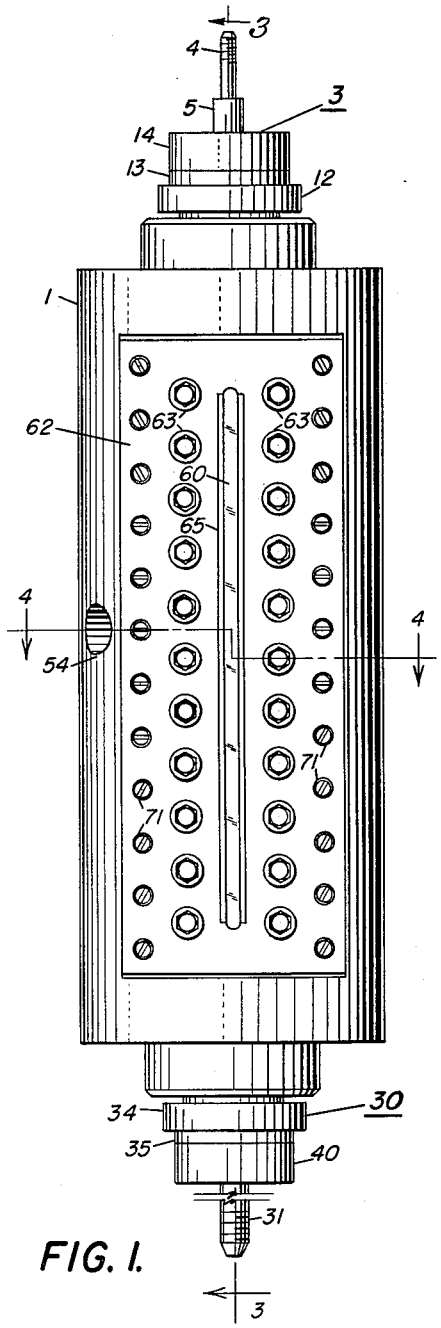

HARRY A. BARCLAY
DOUGLAS K. McLEAN
CARL R. SANDBERG
INVENTORS

BY Frederick E. Dumoulin
ATTORNEY

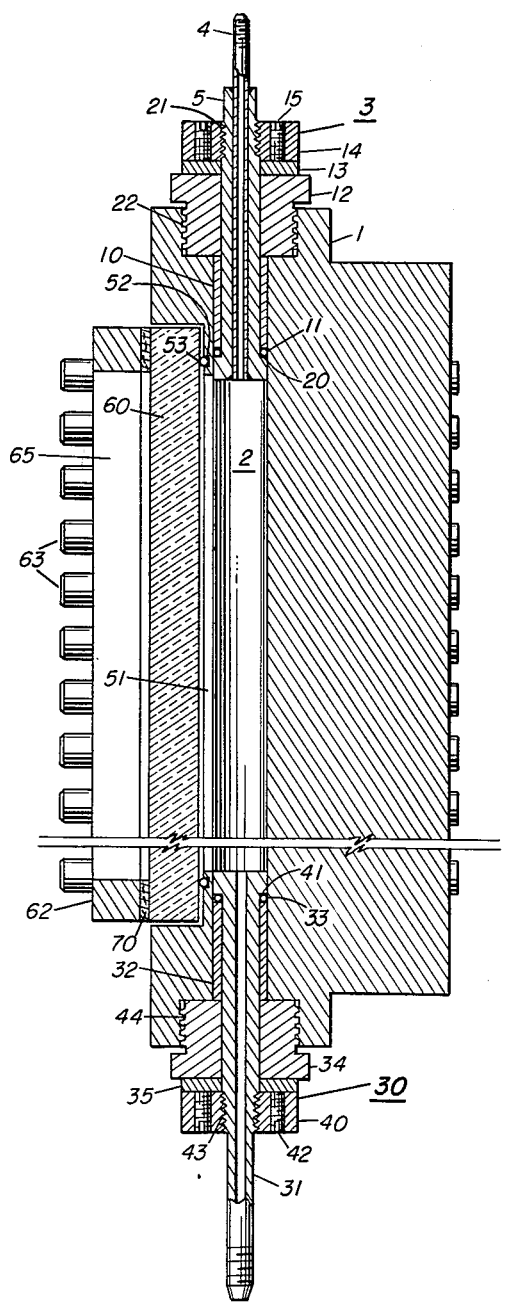
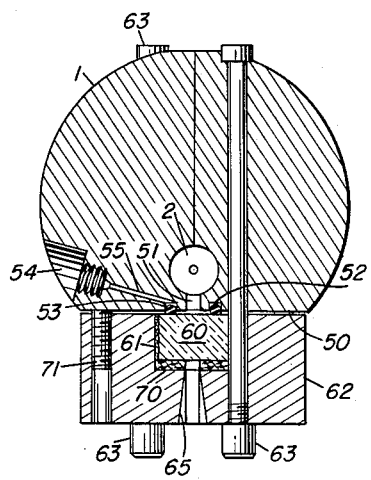
FIG. 4.
FIG. 3.
HARRY A. BARCLAY
DOUGLAS K. McLEAN
CARL R. SANDBERG
INVENTORS

2,922,543

HIGH PRESSURE VISUAL TEST CELL

Harry A. Barclay and Douglas K. McLean, Dallas, and Carl R. Sandberg, Grand Prairie, Tex., assignors, by mesne assignments, to Socony Mobil Oil Company, Inc., New York, N.Y., a corporation of New York Application August 26, 1955, Serial No. 530,862

1 Claim. (Cl. 220—82)

This invention relates to liquid-gas testing apparatus and particularly relates to a high pressure, visual, pressure-volume-temperature cell.

The estimation of the amount of oil or gas or both in a subterranean reservoir and the determination of optimum conditions for producing these fluids from a reservoir require engineering studies based on the phase behavior of the hydrocarbon system confined within the reservoir. There are not currently available reliable methods of predicting the pressure-volume-temperature properties of a hydrocarbon system from a knowledge of the composition of the system. Since it is not feasible to make the desired engineering studies of a hydrocarbon system in a place in the reservoir itself, it is necessary that the studies be made on samples of the fluids and gases from the system in laboratory apparatus which simulates reservoir conditions.

Test cells heretofore used for pressure-volume-temperature measurements have had the disadvantage of not providing means for viewing the entire length of the testing chamber of the cell. To maintain structural rigidity these previous cells have had sight glasses which were comprised of several segments of glass or a single sight glass obstructed by a plurality of solid cross-members which were necessary for structural rigidity of the cell. A further disadvantage of previous calls is the fact that the conventional flat gaskets used to effect a seal with the sight glass required an initial mechanical pressure on the glass sufficient to maintain sealed relationship at the maximum operating pressure of the cell. This results in very frequent glass failures due to the load put on the glass during assembly of the cell.

It has been known to use O-rings to effect a seal with a sight glass in a test cell. However, such a use of O-rings has proved impractical under conditions of high temperature and pressure, such as 350° F. and 20,000 pounds per square inch pressure. It has been found that where an O-ring has once been subjected to such conditions of temperature and pressure and these conditions have been relieved, the O-ring will not again form an effective seal when placed under similar conditions of temperature and pressure. This subsequent failure of the O-ring to form an effective seal is believed to be due to changes, such as changes in density, which occur in the material of which the O-ring is formed, such changes being caused by the temperature and pressure under which the O-ring is initially subjected. In view of these O-ring failures, it has been necessary that the O-rings be replaced after each use in a test cell involving such temperatures and pressures.

It is an object of this invention to make pressure-volume-temperature measurements on hydrocarbon systems under simulated reservoir conditions. It is another object of this invention to provide apparatus which will permit a sample of liquid and gas taken from a subterranean reservoir to be studied under simulated reservoir conditions. It is another object of this invention to provide a test cell which will permit unobstructed visual inspection of a sample of liquids and gases being subjected to simulated pressure-volume-temperature conditions of a subterranean reservoir. It is another object of this invention to provide a test cell which will permit visual inspection of a sample of liquids and gases over the entire length of the chamber in which the sample is contained. It is another object of this invention to provide a test cell having a sight glass which may be effectively sealed without the utilization of mechanical pressure on the sight glass. It is another object of this invention to provide a cell provided with an O-ring seal which does not require replacement for repeated uses of the cell. These and further objects of the invention will be apparent from a study of the following description of the invention.

In accordance with the invention there is provided a test cell comprised of a body containing a test chamber which is preferably formed in the shape of an elongated cylinder. The wall of the body is provided with a narrow elongated slot to permit vision from outside of the body into the test chamber. The width of the elongated slot is substantially less than the diameter of the test chamber. A sight glass is secured over the front of the slot and a seal between the sight glass and body around the slot is provided by an O-ring. Provision is made to hold the O-ring in position against the sight glass by pressure from an outside source thereby permitting the O-ring to be held in sealed relationship with the glass irrespective of whether or not a sample is under pressure within the chamber. Means are provided for introducing the sample into the test cell and for permitting pressure from an outside source to be exerted upon the sample within the test chamber.

Figure 2:
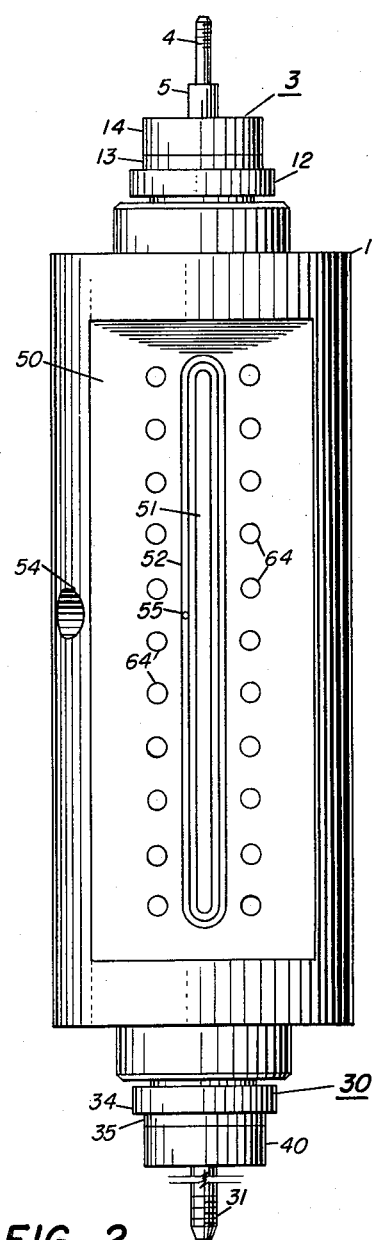

In the drawings, Figure 1 is a front elevation of a test cell constructed in accordance with the invention. Figure 2 is a front elevation of the test cell of Figure 1 with the sight glass, O-ring, and cover plate removed. Figure 3 is a longitudinal sectional view of the test cell of Figure 1 taken along the line 3—3 of Figure 1. Figure 4 is a cross-sectional view of the test cell taken along the line 4—4 of Figure 1.

Referring to the drawings, the reference number 1 designates the body of the test cell. As may be seen by reference to Figure 4, the body may be formed with a substantially circular cross section. It may, however, be formed with a rectangular cross section such as a square. The body is suitably constructed of steel, although it may be made of other materials which will remain structurally rigid under operating pressures and temperatures and which are readily machinable. Body 1 is provided with a test chamber 2, the longitudinal axis of which is preferably parallel to the longitudinal axis of the body. Chamber 2 is formed in body 1 by boring or by any other desired manner of construction. Closure of the upper end of chamber 2 is provided by closure assembly 3 which comprises hollow tube 4, sleeve 5, spacer 10, gasket 11, nut 12, thrust washer 13, and collar nut 14. Collar nut 14 is provided with a plurality of set screws 15. Gasket 11 rests between shoulder 20 provided near the lower end of sleeve 5 and the lower end of spacer 10. Tube 4 and sleeve 5 are preferably welded together at both ends of the sleeve. Collar nut 14 is secured to sleeve 5 by means of threads 21. The closure assembly is held in position within the upper end of body 1 by means of threads 22. After assembling the closure assembly and securing it to body 1, set screws 15 are utilized to pull sleeve 5 in an upward direction which compresses gasket 11 between shoulder 20 and the lower end of spacer 10 urging the gasket outwardly into contact with the sides of chamber 2 to insure pressure-tight sealing of the upper end of chamber 2.

Closure of the lower end of chamber 2 is provided by means of closure assembly 30 secured into the lower end of body 1. Assembly 30 comprises tube 31, spacer 32, gasket 33, nut 34, thrust washer 35, and collar nut 40. Gasket 33 rests between shoulder 41 provided near the upper end of tube 31 and the upper end of spacer 32. Collar nut 40 is provided with a plurality of set screws 42 and is secured to tube 31 by means of threads 43. Closure assembly 30 is held in position in the lower end of body 1 by means of threads 44. After assembly of the closure assembly and insertion into the lower end of body 1, set screws 42 are utilized to pull tube 31 in a downward direction which causes shoulder 41 to compress gasket 33 urging it outwardly into contact with the sides of chamber 2 to provide a pressure-tight seal in the lower end of the chamber.

Body 1 is provided with front face 50 which extends substantially over the entire length of the body and lies in a plane parallel to the longitudinal axis of chamber 2. Longitudinal slot 51 is cut in body 1 from surface 50 into chamber 2 to permit visual inspection of the chamber from outside of the body. Slot 51 is of sufficient length to permit observation of the entire length of chamber 2.

The opening of slot 51 into chamber 2 provides an open-sided chamber that has a tendency to open up under operating pressures. Stated otherwise, the body, under operating pressures, tends to distort in a direction such that slot 51 will widen. Thus, any opening of the chamber will cause a deflection or spreading apart of the sides of slot 51. This spreading apart or deflection of the sides of the slot, if excessive, may cause either fracturing of the sight glass covering the slot or breaking of the seal around the slot between the body and the sight glass, or both. Minimization of the deflection of the sides of slot 51 is accomplished in accordance with a particular feature of the invention by providing the test chamber with walls of non-uniform thickness, the thickness of the wall varying from a minimum at a point adjacent to the slot to a maximum at a point 180° around the chamber from the center of the slot. The absolute thickness of the wall of the chamber at any point will, of course, depend upon the material employed in the construction of body 1 and the pressures and temperatures under which the cell is operating. In the embodiment of the invention shown, applicants have achieved the desired variation in chamber wall thickness by eccentric or off-center positioning of the chamber in a substantially cylindrical body. The width of slot 51, as shown in Fig. 4, is substantially less than the diameter of chamber 2. This provides a maximum amount of wall material around the chamber and minimizes the total force on the sight glass resulting from the pressure within the chamber.

Channel 52 is cut into surface 50 encircling slot 51. Channel 52 serves to accommodate an O-ring seal 53, as shown in Figures 3 and 4, and the channel is of sufficient depth that a pressure medium may be accommodated in the channel behind O-ring 53. The relation between the width of channel 52 and the diameter of O-ring 53 is such that the O-ring will be squeezed by the sides of the channel when the O-ring is placed in the channel. O-ring 53 is formed of a rubber-like material. Body 1 is provided with threaded pressure connection 54 which in turn is connected into the back side of channel 52 by means of passage 55. A source of pressure may be secured to connection 54 to exert through passage 55 a pressure within channel 52 behind O-ring 53.

Sight glass 60 is positioned over the front of slot 51 to permit observation of the sample in the chamber and slot. The sight glass rests within a channel 61 formed in cover plate 62. Cover plate 62 is secured to body 1 by means of bolts 63 which pass through openings 64 provided in body 1. The cover plate is provided with a longitudinal slot 65 which is cut from the front of the plate into channel 61 and so positioned in the plate that the slot will register with slot 51 when the plate is secured on face 50. The front of slot 65 is widened, as shown in Figure 4, to facilitate vision into the chamber. Gasket 70 is positioned along the sides and front of the sight glass to prevent direct contact between the glass and walls of channel 61. A plurality of evenly spaced set screws 71 are provided in plate 62 to permit adjustment of the cover plate with respect to front face 50.

Sight glass 60 is constructed of relatively thick tempered glass capable of withstanding operating pressures of at least 15,000 pounds per square inch and temperatures of at least 300° F. It has been found that as a practical matter sight glasses constructed of even the finest materials and under the most ideal conditions possess certain dimenstional irregularities. Where conventional gasket sealing means are used, it is necessary, as previously mentioned, that during the assembly of a test cell the sight glass be placed under an initial mechanical load sufficient to maintain a seal between a gasket and the glass at operating pressures, and, in view of the dimensional irregularities of most of the glasses currently obtainable, the necessary mechanical loading of the glass frequently results in structural failure of the glass. Another feature of the present invention resides in the fact that the glass need not be placed under an initial mechanical load. As may be seen by referring to Figures 3 and 4, sight glass 60 is not in direct contact with front face 50 or with the walls of channel 61 in front plate 62. The back face of the sight glass rests against O-ring 53 while the sides and front of the sight glass are in contact with gasket 70. Though the sight glass is shown spaced apart a short distance from front face 50, it may, if desired, be permitted to rest lightly against the front fact. With the described form of construction the sight glass rests in position over slot 51 with no initial mechanical load on it necessary. Set screws 71 provide a further safeguard against failure of the sight glass due to initial loading when the apparatus is assembled. The set screws may be used to adjust the plate 62 with respect to face 50 to compensate for irregularities in the sight glass, in face 50, and in the back face of plate 62 and prevent mechanical pressure on the glass.

Leakage from chamber 2 and the slot 51 is prevented by O-ring 53 which encircles slot 51 to form a seal around slot 51 between the sight glass and face 50. To maintain O-ring 53 in contact with the sight glass, a reservoir of liquid or gas under pressure is connected to pressure connection 54. The pressure medium passes through passage 55 to exert a pressure within channel 52 behind the O-ring urging the O-ring forward into contact with the back face of the sight glass. Mercury has worked satisfactorily as a pressure medium for the O-ring. To achieve the necessary sealing the mercury has been maintained at a pressure of some 1,000 to 2,000 pounds per square inch in excess of the maximum pressure which will be exerted upon the sample being tested in the chamber. It will thus be seen that in lieu of mechanical loading of the sight glass to maintain a seal between the sight glass and O-ring 53, there is provided an O-ring which is kept in sealed relationship with the sight glass by means of pressure from a source outside of the body of the cell. As long as the pressure is maintained upon the O-ring, there is no necessity for replacing or changing the O-ring. This pressure upon the O-ring can be maintained at all times, irrespective of whether or not a sample under pressure is in the test chamber. The glass is relatively free to expand and contract with temperature changes, an effective seal is maintained with the sight glass, and it is not required to change the O-ring for repeated tests.

During the testing of a sample, it is necessary that the sample be maintained at specified temperatures. Due to the relatively large masses which make up the cell the sample temperature is controlled by the temperature of the entire cell. The temperature of the cell may most conveniently be controlled by placing the cell within a confined space in an atmosphere of air, where the temperature of the air surrounding the cell is thermostatically controlled. This can be accomplished by placing the cell within an insulated box having a glass front through which the cell may be observed. The temperature of the air injected into the box is controlled by a thermostat positioned within the box.

The first step involved in charging the cell with a sample to be tested is the evacuation of the air present within the chamber by means of a vacuum pump connected to tube 4. Subsequent to the evacuation of the air from the chamber the sample is introduced into the chamber through tube 31. After introduction of the sample into the chamber, tube 31 is connected to a source of pressure, such as a reservoir of mercury under pressure. By means of the mercury the pressure on the sample within the chamber 2 may be varied as desired. When a change is made in the pressure on the sample, the cell is rocked to agitate the sample in order to expedite achieving a state of equilibrium within the sample. If required by the test being conducted in the cell, portions of the sample may be drawn off from the chamber through tube 4. The sample within the chamber, under various conditions of temperature, pressure and volume, may be observed at all times through sight glass 60. The interfaces which may exist between the mercury and oil and oil and gas may be observed. The pressure may be determined at which gas will go into solution with the oil or come out of solution from oil by observation of what is taking place within the chamber during changes of pressure on the sample.

It will be understood that at all times there must be a source of pressure, such as mercury under pressure, connected to pressure connection 54 to maintain O-ring 53 in sealed relationship with the sight glass to prevent escape of the sample from the chamber and slot and to prevent the necessity of replacing the O-ring for repeated tests. This pressure utilized behind the O-ring is preferably maintained from 1,000 to 2,000 pounds per square inch greater than the maximum pressure which will be exerted upon the sample within chamber 2.

While the invention has been described in connection with certain specific embodiments thereof, it will now be understood that further modifications will suggest themselves to those skilled in the art and it is intended to cover such modifications as fall within the scope of the appended claim.

What is claimed is:

In a visual pressure-volume-temperature cell the combination which comprises a substantially cylindrical body, a flat front face on said body extending over substantially the entire length of said body, said face lying in a plane parallel to the longitudinal axis of said body, a cylindrical sample chamber eccentrically positioned within said body, the longitudinal axis of said chamber being parallel to the longitudinal axis of said body and being positioned between the longitudinal axis of said body and said front face in a plane passing through the longitudinal axis of said body perpendicular to said front face, said body being provided with an elongated slot extending from said front face into said chamber, the sides of said slot being perpendicular to said front face and being equidistant from said plane passing through the longitudinal axis of said body perpendicular to said front face, the distance between the said sides of said slot being substantially less than the diameter of said chamber, said body being further provided with a channel formed in said front face completely encircling said slot, an O-ring seal positioned in said channel, said channel being of sufficient depth to accommodate a pressure medium behind said O-ring, the width of said channel and the diameter of said O-ring being so related as to permit a squeeze fit between said O-ring and said channel, a pressure connection in said body, said body being provided with a passage leading from said pressure connection into the back of said channel to permit the introduction of a pressure medium into said channel from outside of said body, a cover plate positioned over said front face, said cover plate being provided with a recess extending into said plate from the back surface of said plate adapted to accommodate a sight glass, a plurality of bolts extending through said body and said plate to secure said plate in position, a sight glass positioned in said recess in said plate over said slot in contact with said O-ring, said sight glass being formed of relatively thick tempered glass, gasket means between the front and sides of said sight glass and said recess in said plate to prevent direct contact between said sight glass and said plate, an elongated slot in said plate in registry with said slot in said body opening into said chamber to permit visual inspection of said cylindrical chamber through said plate and said sight glass, a plurality of set screws extending through said plate adapted to be moved into contact with said front face to permit adjustment of said plate relative to said front face to prevent the imposition of an initial mechanical force on said sight glass, a closure assembly secured to the upper end of said body in sealed relationship with the upper end of said cylindrical chamber, said closure assembly being provided with passage means extending into the upper end of said chamber, and a closure assembly secured to the lower end of said body in sealed relationship with the lower end of said chamber, said closure assembly being provided with passage means extending from outside said body into the said lower end of said chamber.

References Cited in the file of this patent

UNITED STATES PATENTS

| | | |
|---|---|---|
| 1,036,289 | Mauger | Aug. 20, 1912 |
| 1,130,857 | Taylor | Mar. 9, 1915 |
| 1,800,085 | Kroeger et al. | Apr. 17, 1931 |
| 1,889,606 | Lange | Nov. 29, 1932 |
| 2,480,070 | Yoder | Aug. 23, 1949 |
| 2,491,599 | Allen | Dec. 20, 1949 |
| 2,510,729 | Van Ham | June 6, 1950 |
| 2,527,792 | Buehler | Oct. 31, 1950 |
| 2,672,757 | Johnson | Mar. 23, 1954 |
| 2,738,996 | Andersson | Mar. 20, 1956 |

UNITED STATES PATENT OFFICE
CERTIFICATE OF CORRECTION

Patent No. 2,922,543            January 26, 1960

Harry A. Barclay et al.

It is hereby certified that error appears in the printed specification of the above numbered patent requiring correction and that the said Letters Patent should read as corrected below.

Column 1, line 40, for "calls" read -- cells --; column 4, line 17, for "dimenstional" read -- dimensional --; line 25, for "frequenly" read -- frequently --; line 36, for "fact" read -- face --.

Signed and sealed this 12th day of July 1960.

(SEAL)
Attest:

KARL H. AXLINE
Attesting Officer

ROBERT C. WATSON
Commissioner of Patents